P. JORGENSON.
ROTARY ENGINE.
APPLICATION FILED FEB. 12, 1913.
1,075,152.
Patented Oct. 7, 1913.
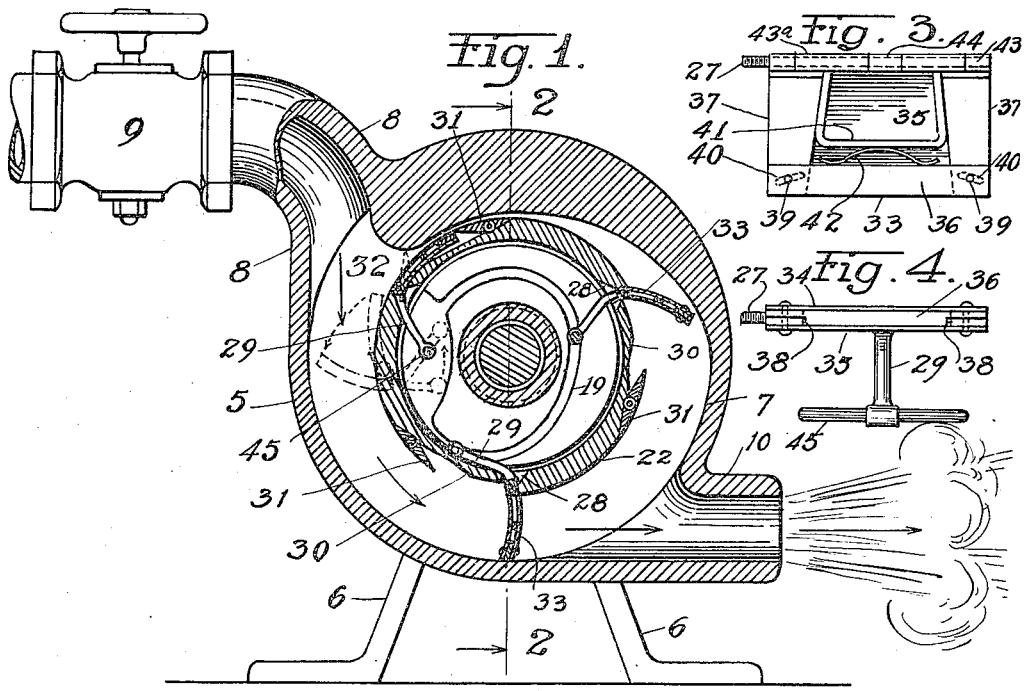
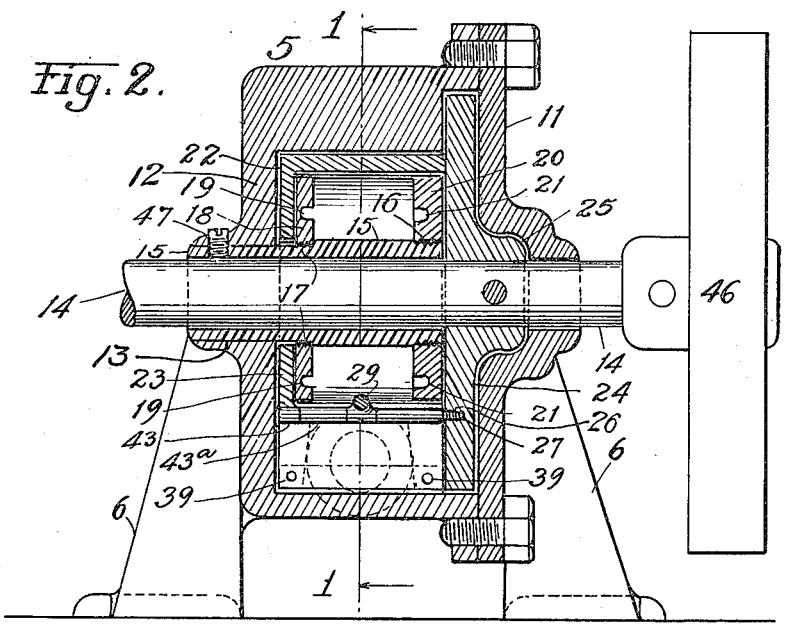
WITNESSES:
H. P. Palmer
A. S. Phillips
INVENTOR:
Peter Jorgenson,
By Chas. C. Tillman ATTY.

UNITED STATES PATENT OFFICE.

PETER JORGENSON, OF CHICAGO, ILLINOIS.

ROTARY ENGINE.

1,075,152.  Specification of Letters Patent.  Patented Oct. 7, 1913.

Application filed February 12, 1913. Serial No. 747,859.

*To all whom it may concern:*

Be it known that I, PETER JORGENSON, a citizen of the United States of America, residing at Chicago, in the county of Cook and State of Illinois, have invented certain new and useful Improvements in Rotary Engines, of which the following is a specification.

This invention relates to improvements in a rotary engine to be used for various purposes, and of a type in which any suitable motive fluid such as steam, compressed air or gas may be employed for operating the same. But it is more particularly intended to be operated by steam, and in the present instance it will be so described and referred to; and it consists in certain peculiarities of the construction, novel arrangement and operation of the various parts thereof, as will be hereinafter more fully described and specifically claimed.

The principal object of the invention is to provide a rotary engine which shall be simple and inexpensive in construction, compact in form, strong, durable, powerful and efficient in operation, and so made as to overcome dead centers in its operation.

Other objects and advantages of the invention will be disclosed in the subjoined description and explanation.

In the accompanying drawings, which serve to illustrate an embodiment of the invention—Figure 1 is a cross sectional view taken on line 1—1 of Fig. 2, looking in the direction indicated by the arrows, and showing by dotted lines some of the positions the wing pistons carried by the rotor will assume in the revolution of the latter. Fig. 2 is a sectional view partly in elevation taken on line 2—2 of Fig. 1, looking in the direction indicated by the arrows; Fig. 3 is a detached view of one of the wing pistons showing one of the plates thereof removed; and Fig. 4 is a detached view of one of said pistons looking from the outer edge thereof.

Like numerals of reference refer to corresponding parts throughout the different views in the drawing.

The reference numeral 5 designates the engine cylinder, which may be of any suitable size and form, but preferably cylindrical in shape, as shown. This cylinder is mounted on a suitable support such as legs 6, which will rest at their lower ends on the floor or other suitable foundation. The cylinder 5 is provided with a cavity having a convolute peripheral wall 7, which cavity has communication at its upper portion through a pipe or conduit 8, leading from the upper portion of the cylinder 5 to a source of motive fluid, such as a steam boiler, and said pipe or conduit is provided with a valve 9 for regulating the flow of fluid or steam to the cylinder, or for shutting off the steam. The lower portion of the cylinder is provided with an exhaust outlet 10.

As shown in Fig. 2 one end of the cylinder is closed by means of a head plate 11, which is bolted to the cylinder in the ordinary manner, and the other end of the cylinder is provided with a head 12, which has an opening 13, to receive the power shaft 14, and a sleeve 15, which surrounds said shaft. This sleeve is provided at its end adjacent to the head plate 11, with screw threads 16, and has its other end slightly reduced as shown, and provided at the inner portion of said reduced part with screw threads 17, to engage a plate 18, which is screwed onto the sleeve 15, and has on its inner surface a cam groove 19. Engaging the threads 16, of the sleeve 15, is another plate 20, which has on its inner surface a cam groove 21, which coincides with the cam groove 19, of the plate 18. Rotatably mounted on the sleeve 15, is the rotor 22, which is cylindrical in shape, and is provided at its end adjacent to the guide plate 18, with a head 23, and has its other end open, but resting against a disk or plate 24, the hub 25 of which is keyed or fixed to the shaft 14, so as to turn therewith. The plate 24 is provided on its inner surface with a series of screw threaded openings 26, to receive screw threaded rods 27, which are employed to pivotally mount the wing pistons on the rotor 22, as will be presently explained.

As shown in Fig. 1 the rotor is provided with a number of openings 28, which are flared inwardly and are for the reception and operation of the arms 29, of the wing pistons. It will also be observed by reference to Fig. 1 that the rotor is provided on its periphery with a series of recesses 30, which are located rearwardly of the openings 28, that is, assuming that the rotor travels or rotates in the direction indicated by the arrows in Fig. 1, then the recesses 30 would be rearwardly of said openings. In each of the recesses 30, and at the rear portion thereof, is pivotally secured a trap 31, the front end of each of which extends to near the rear end of each of the wing pistons when the latter are in their folded or inactive positions, as shown at 32 in Fig. 1 of the drawing.

Each of the wing pistons, which are indicated as a whole by the reference numeral 33, consists of a pair of slightly curved plates 34 and 35, which are spaced apart as shown, and are held in such spaced position by means of a movable bar 36, located at their outer edges, and by means of movable bars 37, located between their ends. The bar 36 is provided with recesses 38, at its ends to receive the ends adjacent thereto of the bars 37, which ends are reduced at said points to fit in said recesses. The bar 36 has near each of its ends a transverse pin 39, which extends through slots 40 in the bars 37, which slots are oppositely inclined, as is clearly shown in Fig. 3 of the drawing. One of the plates 34 or 35, preferably the plate 35, is provided on its inner surface with a rib 41, between which and the inner edge of the bar 36, is located a spring 42, which has a tendency to force the bar 36 outwardly, thereby causing the bars 37 also to be forced outwardly between the plates 34 and 35, and against the inner surface of the plate 24 and the head 12 of the rotor.

One of the plates 34 or 35 of each of the wing pistons is provided at its edge adjacent to the rod 27, with a tubular extension 43, through which the rod 27 is passed, and each of the arms 29 is provided with a tubular portion 44, for the reception of said rod. The inner end of each of the arms 29, is provided with a transverse rod 45, the ends of which extend into the cam grooves 19 and 21 of the guide plates 18 and 20 respectively. The arms 29 and wing pistons 37, are adapted to move in unison, so that when the rods 45, carried by said arms, are moved to the outer portions of the cam grooves 19 and 21, as shown in the lower portion of Fig. 1, the wing piston will be in its extended position so as to receive full pressure of the steam or motive fluid. The driving shaft 14 has rigidly mounted thereon a pulley 46, to which a belt may be applied for transmitting power to the machine or part to be operated by the engine.

By reference to Fig. 1 of the drawing, it will be seen that the recesses 30, extend rearwardly from the openings 28 in the rotor, assuming that the latter rotates in the direction indicated by the arrows in said figure, and that the front portion of each recess is curved outwardly while its intermediate portion is curved inwardly and its extreme rear portion is substantially straight or flat. It will also be observed by reference to said figure that each of the traps 31 tapers from its middle portion, at which point it is pivotally connected to the rotor toward each of its edges, thus forming what may be termed knife edges. By this arrangement of the recesses and the traps, it is obvious that as soon as the front edge of the trap passes out of contact with the wall of the cylinder cavity at its upper left hand portion, the pressure of the steam will force the forwardly extended edge of the trap inwardly or into the inwardly curved portion of the recess 30, thus allowing steam to pass under the wing piston just in front of said trap, which will cause said piston to move outwardly toward the wall of the cavity of the cylinder, as is indicated by dotted lines in Fig. 1 of the drawing, after which the cam grooves 19 and 21 of the plates 18 and 20 respectively, co-acting with the rod 45, on the arm 29, of said piston, will move the same farther outwardly and against the wall of the cylinder.

From the foregoing and by reference to the drawing, it will be understood that when the parts are in the positions shown by continuous lines in Fig. 1 of the drawing, and steam is admitted through the pipe 8, pressure thereof will be exerted on the wing piston 33, at the bottom of the cylinder, and that the rotor 22, will be caused to revolve, in which operation the trap 31, near the steam inlet will be tilted on its pivot as shown by dotted lines, thus allowing steam to pass into the pocket or recess 30, between the wing piston 33, adjacent to said trap, when the piston will be moved outwardly as shown by dotted lines, by reason of the pressure of the steam, and also by reason of the movement of the rod 45, on the arm 29, of the last named piston in the cam grooves 19 and 21, of the plates 18 and 20 respectively, which plates are non-rotatable on the sleeve 15, which surrounds the driving shaft, and which sleeve is fixed to the cylinder 5, by means of a set-screw 47. In the rotation of the rotor, the other wing pistons 33 will be caused to assume about the positions shown in Fig. 1, and it is obvious that as the wing piston 33 at the bottom of the cylinder passes the exhaust outlet 10, steam will be discharged through said outlet and said piston will be gradually forced to its normal position against the rotor as the latter revolves, by reason of the movement of the rod 45 thereof in the cam grooves therefor. And, besides, the peripheral wall of the cavity of the cylinder will also serve to force the pistons into their normal positions, by which expression is meant the position occupied by the piston near the steam inlet of the cylinder, as shown by continuous lines.

It is apparent that as the bars 36 of the piston contact with the inner surface of the cylinder, they will be held closely in such contact by means of the springs 42, and that the bars 37 will be forced into close, yet yielding contact, with the heads 12 and 24, thus providing packing to prevent the escape of steam or motive fluid.

Having thus fully described my invention, what I claim as new and desire to secure by Letters Patent is—

1. In a rotary engine, the combination with a suitably mounted cylinder having communication with a supply of motive fluid and an exhaust outlet and provided with a cavity having its peripheral wall convolute, of a shaft rotatably journaled in the cylinder and having means for the transmission of power, a sleeve surrounding said shaft and extended into the cylinder and fixed thereto, a hollow rotor rotatably mounted on said sleeve and having in its outer periphery a series of recesses extended from end to end thereof, said rotor also having at the front edge of each of said recesses an opening, each of said recesses having intermediate its edges a depression, a plate fixed on the sleeve near each end of the rotor and each having a cam groove on its inner surface, a series of wing pistons pivotally mounted on the rotor at one of the edges of the recesses and adapted to normally lie in said recesses, a trap pivotally mounted on the rotor at the opposite edge of each of the recesses thereof and having its front and rear edges tapered, an arm extended from each of the wing pistons through said openings in the rotor, and a cross-rod on the inner portion of each of said arms having its ends engaging the said cam grooves.

2. In a rotary engine, an automatically expanding wing piston consisting of two plates spaced apart in parallelism and having extended from one of the edges of said plates an arm provided with a cross-rod at its free end, one of said plates having on its inner surface a longitudinally extended rib, a bar movably mounted between the said plates at their edges opposite said arm, a spring interposed between said bar and said rib, said bar having near its ends a pin projecting from each side thereof, and a bar interposed between said plates at each end thereof and each having an oppositely inclined slot through which said pins are extended.

In witness whereof, I have hereunto subscribed my name this 6th day of February 1913, in the presence of two subscribing witnesses.

PETER JORGENSON.

Witnesses:
CHAS. C. TILLMAN,
A. S. PHILLIPS.

---

Copies of this patent may be obtained for five cents each, by addressing the "Commissioner of Patents, Washington, D. C."